United States Patent [19]

Moller et al.

[11] Patent Number: 4,995,737
[45] Date of Patent: Feb. 26, 1991

[54] AXIAL ANTI-FRICTION BEARING

[75] Inventors: Rainer Moller, Schweinfurt; Manfred Pretscher, Meine; Anton Schmidt, Hassfurt, all of Fed. Rep. of Germany

[73] Assignee: FAG Kugelfischer Georg Schafer (KGaA), Fed. Rep. of Germany

[21] Appl. No.: 521,609

[22] Filed: May 10, 1990

[30] Foreign Application Priority Data

May 23, 1989 [DE] Fed. Rep. of Germany ... 8906357[U]

[51] Int. Cl.$^5$ .................. F16C 33/76; F16C 19/30
[52] U.S. Cl. ........................ 384/607; 384/611
[58] Field of Search .............. 384/590, 607, 609–622

[56] References Cited

U.S. PATENT DOCUMENTS

| | | | |
|---|---|---|---|
| 3,972,574 | 8/1976 | Pitner | 384/621 |
| 4,166,662 | 9/1979 | Chiba et al. | 384/622 |
| 4,266,913 | 5/1981 | Nomura | 384/614 X |
| 4,566,812 | 1/1986 | Takei et al. | 384/607 X |
| 4,699,530 | 10/1987 | Satoh et al. | 384/611 X |
| 4,854,745 | 8/1989 | Kamimura et al. | 384/607 X |

FOREIGN PATENT DOCUMENTS 2658748 3/1989 Fed. Rep. of Germany .

Primary Examiner—Thomas R. Hannon
Attorney, Agent, or Firm—Ostrolenk, Faber, Gerb & Soffen

[57] ABSTRACT

An axial anti-friction bearing for mounting of the spring pad in a shock absorber leg of a vehicle wheel. The bearing including two races supporting rolling bodies between them. Each race is supported by a separate annular plastic cap. The two caps are snapped together in a sliding manner with respect to each other by holding noses to form a structural unit. At least one pin and preferably a plurality thereof protrude approximately axially from the cap. The spring plate to which the bearing is supported includes cutouts, in the form of drain holes in the spring plate, placed to each receive one of the pins. The bearing is thereby held in snap like manner on the spring plate via the pins. Each pin is provided with a hook and each extends over an arcuate portion of the circumference of the spring plate, approximately 30°.

8 Claims, 1 Drawing Sheet

AXIAL ANTI-FRICTION BEARING

BACKGROUND OF THE INVENTION

The present invention refers to an axial anti-friction bearing and particularly to its attachment to a spring plate of a shock absorber in a vehicle.

Such axial anti-friction bearings are known from the applicant's Federal Republic of Germany Patent No. 26 58 748. The bearings are employed in a large variety of motor vehicles for the rotatable mounting of the spring pad in shock-absorber legs.

They have a disadvantage. Until the shock-absorber leg is installed in the motor vehicle, the axial bearing, which is a separate structural part, is not firmly attached to the surrounding parts, such as the spring plate or body. Thus upon the "handling" of the shock absorber leg, the bearing can fall out, slip or tilt. In view of the continuous increase in the use of automated assembly or robotizing in automobile factories, this is especially disadvantageous.

SUMMARY OF THE INVENTION

The object of the present invention is to avoid the above disadvantage by simple means and without great additional expense, and to provide a practical attachment of the axial bearing to the surrounding part.

The invention concerns an axial anti-friction bearing for mounting the spring pad in a shock absorber leg of a vehicle wheel. The bearing includes two races supporting rolling bodies between them. Each race is supported by a separate annular plastic cap. The two caps are snapped together in sliding manner with respect to each other by holding noses to form a structural unit. At least one pin and preferably a plurality of pins protrude approximately axially from the cap.

The spring plate to which the bearing is supported includes cutouts which are in the form of drain holes in the spring plate. The cutouts are placed to each receive one of the pins from the cap, and the bearing is thereby held in snap like manner on the spring plate via the pins. The pins are provided with a hook. The pins extend over an arcuate portion of the circumference of the spring plate, approximately 30°.

It has been found particularly advantageous to snap the pins into the drainholes which are already present on the spring plate. In this way, no changes are necessary, aside from the development of the hooks on the pin, which is simple from the standpoint of injection molding. The drainholes in the spring plate are present in any event so that the splash water, to which the shock absorber legs are exposed in the wheel box, can run off.

Other objects and features of the invention are explained on the basis of an embodiment shown in the accompanying drawings.

DESCRIPTION OF A PREFERRED EMBODIMENT

Figure 1:
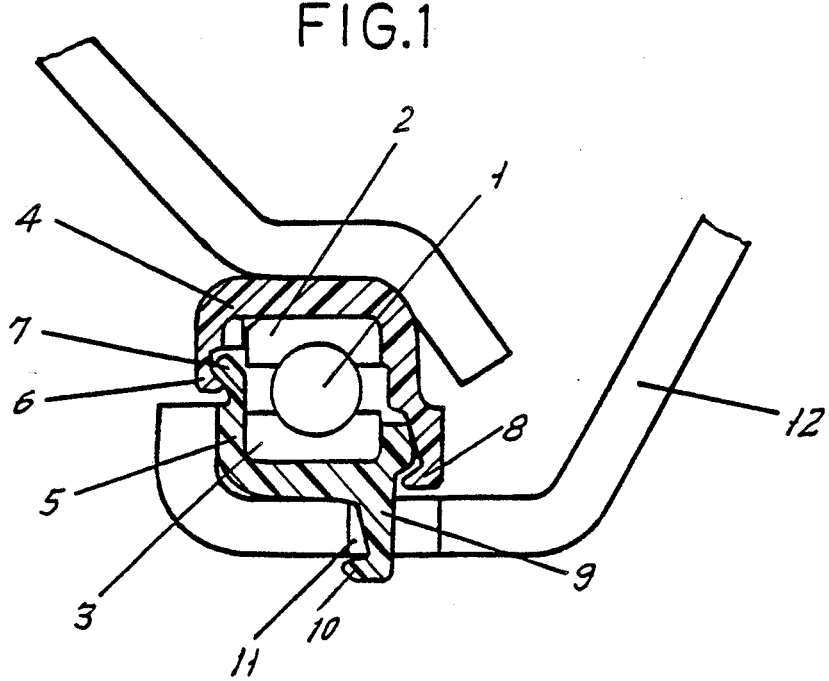
FIG. 1 is a partial cross-section through an axial bearing in accordance with the invention.

In FIG. 1, the rolling bodies 1 of the bearing are arranged between two axially separated, annular races 2 and 3. It has been found advantageous to produce the races from hardened rings that are produced by a non-machining method. This is to compensate for errors in alignment and tolerances without having to be concerned with the breaking of a race. Each of the caps 4 and 5 receives its respective one of the races 2 and 3. The caps are comprised of plastic, which contributes substantially to the compensation. The caps 4 and 5 are snapped together to form a structural unit by means of cooperating detent projections 6, 7, 8 which are lubricated "for life" and are tightly connected. The legs of the detent projections slide on each other and thus permit a swinging movement when the spring of the shock absorber leg deflects. The spring suspension of the vehicle is therefore softer and more comfortable upon small deflections.

A plurality of orientation pins 9 are developed on at least the one plastic cap 5 and extend approximately axially of the bearing. The pins 9 are each provided with hook like projections 10 which engage into and behind drain openings or cutouts 11 in the spring plate 12. In this way, the axial bearing is held in snap like fashion on the spring plate 12 to avoid difficulties that can occur upon the handling of the shock absorber leg.

Figure 2:
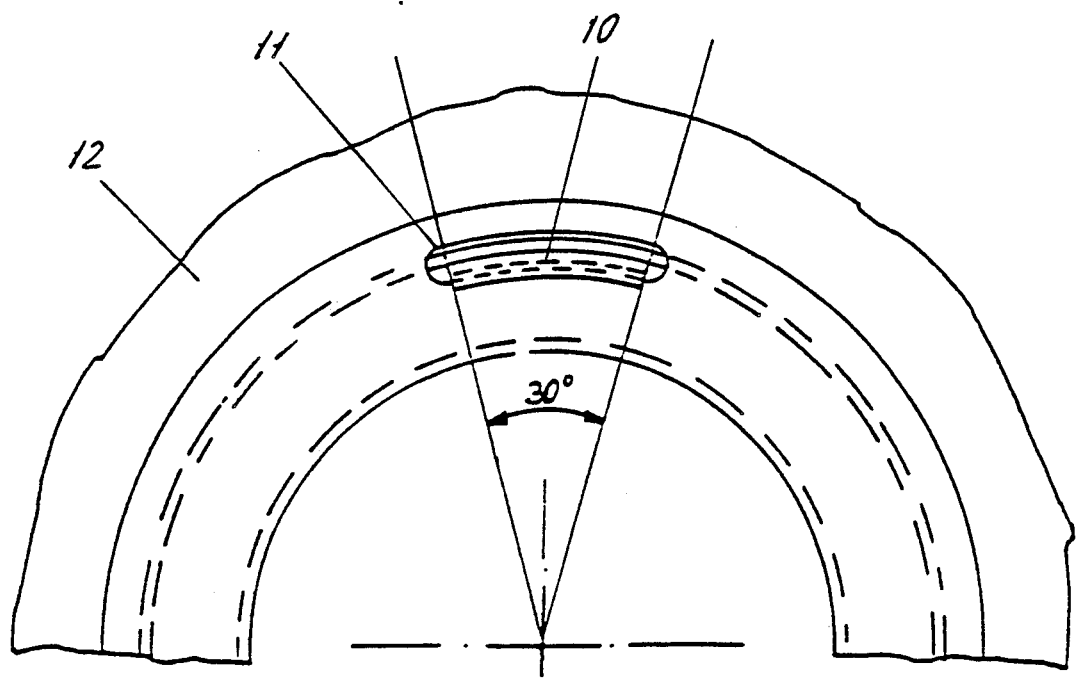
FIG. 2 shows a portion thereof in side view.

As can be noted from FIG. 2, the pins 9 can be provided with hooks 10 that extend over 30° of the circumference. The pins themselves extend over such an arc. The arcuate development of the pins 9 will, of course, correspond to the shape of the drain openings 11 in the spring plate 12.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. An axial anti-friction bearing for the rotatable mounting of a spring pad in the shock-absorber leg of a wheel, the bearing comprising:

first and second axially separated, annular races and a plurality of rolling bodies disposed between the races;

a respective annular cap comprised of plastic material holds each of the races; each cap including a respective cooperating holding nose for cooperating with a holding nose on the other cap for snapping the caps together in sliding and sealing manner, thereby for holding the races in position to guide the rolling bodies between the races;

at least one pin protruding approximately axially of the bearing from at least one of the caps, a respective projection provided on the pin for engaging into and then locking behind a cutout in a spring plate to which the bearing is supported for holding the bearing in snap like manner on the spring plate by means of the pins.

2. In combination, the bearing of claim 1 and a spring plate to which the bearing is supported, the spring plate including drain holes defined at cutouts in the plate, and the pin on the cap being snapped into one of the drain holes on the spring plate.

3. The combination of claim 2, wherein there are a plurality of the cutouts in the spring plate and a plurality of the pins on the cap, the pins being positioned for each extending into one of the drain holes on the spring plate.

4. The combination of claim 3, wherein each pin is provided with a respective hook for hooking to the spring plate 5. The combination of claim 4, wherein each of the pins extends over a circumferential distance approximating that of the respective drain holes in the spring plate 6. The combination of claim 5, wherein each of the pins extends over a circumferential arc of greater than 30°.

7. The combination claim 2, wherein there are a plurality of the pins at circumferentially spaced locations around the cap and a plurality of the cutouts in the spring plate for receiving the plurality of pins.

8. The combination of claim 7, wherein each pin is provided with a respective hook for hooking to the spring plate

* * * * *